(12) United States Patent
Koguchi et al.

(10) Patent No.: US 10,928,591 B2
(45) Date of Patent: Feb. 23, 2021

(54) NECK-HUNG FUSION SPLICER OPERATION TRAY HAVING DETACHABLE FLANKING TRAYS

(71) Applicant: SEI OPTIFRONTIER CO., LTD., Yokohama (JP)

(72) Inventors: Keitaro Koguchi, Chigasaki (JP); Yoshiyuki Nishizawa, Chigasaki (JP)

(73) Assignee: SEI OPTIFRONTIER CO., LTD., Yokohama (JP)

( * ) Notice: Subject to any disclaimer, the term of this patent is extended or adjusted under 35 U.S.C. 154(b) by 287 days.

(21) Appl. No.: 16/302,148

(22) PCT Filed: May 16, 2017

(86) PCT No.: PCT/JP2017/018380
§ 371 (c)(1),
(2) Date: Nov. 16, 2018

(87) PCT Pub. No.: WO2017/199961
PCT Pub. Date: Nov. 23, 2017

(65) Prior Publication Data
US 2019/0187379 A1   Jun. 20, 2019

(30) Foreign Application Priority Data

May 18, 2016 (JP) .............................. JP2016-099523

(51) Int. Cl.
G02B 6/255   (2006.01)
(52) U.S. Cl.
CPC ................................. *G02B 6/2553* (2013.01)
(58) Field of Classification Search
CPC ................................................. G02B 6/2553
See application file for complete search history.

(56) References Cited

U.S. PATENT DOCUMENTS 5,715,348 A * 2/1998 Falkenberg .......... G02B 6/4452
385/135
5,870,519 A * 2/1999 Jenkins .................... G02B 6/00
385/135

(Continued)

FOREIGN PATENT DOCUMENTS

JP         2014-74796 A    4/2014
WO    WO-2014/054307 A1    4/2014

OTHER PUBLICATIONS

International Preliminary Report on Patentability for PCT/JP2017/018380 dates Nov. 20, 2018, 5 pages (Year: 2018).*

*Primary Examiner* — Andrew Jordan
(74) *Attorney, Agent, or Firm* — Faegre Drinker Biddle & Reath LLP

(57) ABSTRACT

A neck-hung operation tray includes a first operation tray in which a fusion splicer is mounted, and a second operation tray which is assembled with the first operation tray. The first operation tray includes an installation surface on which the fusion splicer is installed, and a pair of projecting parts disposed around the installation surface and having through holes, and first openings respectively disposed in the vicinity of the projecting parts in the installation surface. The second operation tray includes an operation surface, a second opening formed in the operation surface, and the engaging parts projecting outward from the second opening. The engaging parts are engaged with the first openings, and the projecting parts are accommodated in the second opening such that the fusion splicer is mounted on the installation surface and the top surfaces of the engaging parts.

5 Claims, 14 Drawing Sheets

(56) References Cited

U.S. PATENT DOCUMENTS

| | | | | |
|---|---|---|---|---|
| 7,305,169 | B2* | 12/2007 | Honma | G02B 6/25 225/93 |
| 7,418,184 | B1* | 8/2008 | Gonzales | G02B 6/4471 385/134 |
| 7,613,377 | B2* | 11/2009 | Gonzales | G02B 6/4471 385/134 |
| 8,567,705 | B2* | 10/2013 | Yamaguchi | B02C 15/007 241/121 |
| 9,513,438 | B2* | 12/2016 | Lloyd | G02B 6/2557 |
| 2006/0263028 | A1* | 11/2006 | Honma | G02B 6/25 385/134 |
| 2008/0226250 | A1* | 9/2008 | Gonzales | G02B 6/4471 385/135 |
| 2008/0310811 | A1* | 12/2008 | Gonzales | G02B 6/4455 385/135 |
| 2013/0146694 | A1* | 6/2013 | Yamaguchi | B02C 15/007 241/117 |
| 2014/0157830 | A1* | 6/2014 | Kawanishi | G02B 6/2555 65/501 |
| 2016/0091661 | A1* | 3/2016 | Lloyd | G02B 6/2553 156/158 |
| 2019/0187379 | A1* | 6/2019 | Koguchi | G02B 6/2553 |

* cited by examiner

NECK-HUNG FUSION SPLICER OPERATION TRAY HAVING DETACHABLE FLANKING TRAYS

TECHNICAL FIELD

The present disclosure relates to a neck-hung operation tray for a fusion splicer.

This application is based upon and claims the benefit of priority from Japanese Patent Application No. 2016-099523, filed May 18, 2016, the entire contents of which are incorporated herein by reference.

BACKGROUND ART

During splicing of an optical fiber, the following operations are generally required.

(1) An optical fiber is extracted from an optical fiber cable.

(2) A resin coating (leading end) covering the extracted optical fiber is removed by an optical fiber coating stripping tool.

(3) A resin coating waste remaining on a surface of the glass (bare optical fiber) of the optical fiber after the removal of the coating from the leading end is removed by cloth or paper moistened with alcohol.

(4) The cleaned optical fiber is cleaved by an optical fiber cleaver.

(5) The cleaved optical fiber is spliced by an optical fiber fusion splicer.

(6) The spliced optical fiber is covered with a thermal-shrinkable reinforcing sleeve and heat-reinforced by a fusion splicer heater.

(7) The heat-reinforced optical fiber is stored in a storing tray of a splicing part housing case.

Among the above, operations (2) to (4) are referred to as the preprocessing operation of the optical fiber before fusion splicing, and a space is necessary to perform these operations and to accommodate various tools such as coating stripping tool, cleaning cloth or paper, alcohol container, optical fiber cleaver (cutter), and the like. Patent Literature 1 relates to an optical fiber fusion splice system having a configuration where a fusion splicer and an operation table are housed in a housing box, and discloses the operation table having a fusion splicer installation surface for accommodating the fusion splicer and an operation surface for performing the preprocessing operations of the optical fiber.

CITATION LIST

Patent Literature

[Patent Literature 1]: Japanese Unexamined Patent Application Publication No. 2014-74796

SUMMARY OF THE INVENTION

Solution to Problem

A neck-hung operation tray for a fusion splicer according to the present disclosure is configured from a first operation tray in which the fusion splicer for splicing optical fibers is mounted, and a second operation tray which can be assembled with the first operation tray, in which the first operation tray includes an installation surface on which the fusion splicer is installed, a pair of projecting parts disposed on an outer perimeter of the installation surface and having a through hole through which an operator passes a string-shaped member for mounting, and first openings disposed in the vicinity of the pair of projecting parts on the installation surface, respectively, and the second operation tray includes an operation surface, a second opening formed in the operation surface, and an engaging part projecting outward from the second opening, in which the fusion splicer is mounted on the installation surface and a top surface of the engaging part in a state in which the second operation tray is assembled with the first operation tray when the engaging part is engaged in the first opening and each of the projecting parts is accommodated in the second opening.

MODE FOR CARRYING OUT THE INVENTION

Technical Problem

Figure 1:
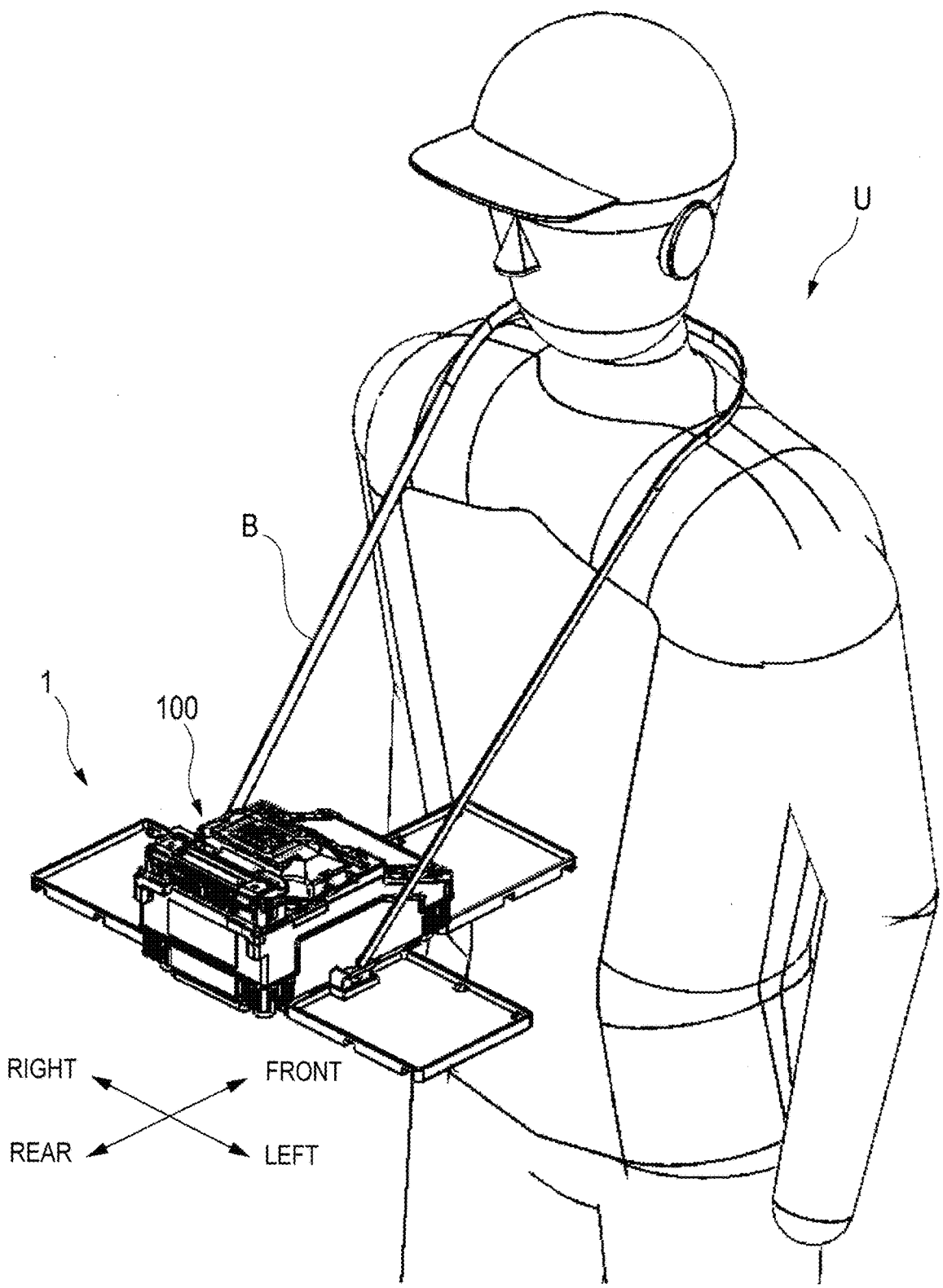
FIG. 1 is a perspective view illustrating an example of use of a neck-hung operation tray for a fusion splicer according to the present disclosure.

The operation table disclosed in Patent Literature 1 occupies a large space inside the housing case, resulting in narrowed space for housing other parts. In addition, since the operation table has an operation surface integrated close to the right and left sides of the fusion splicer installation surface and has a relatively large size and complicated shape, the initial cost of the mold for resin-molding the operation table increases.

An object of the present disclosure is to provide a neck-hung operation tray for a fusion splicer, which requires a reduced space for housing in a housing case when housed together with the fusion splicer, manufactured at a low cost, and has a good assembled state between a first operation tray and a second operation tray which are separately formed.

Advantageous Effects of the Invention

According to the present disclosure, it is possible to provide a neck-hung operation tray for a fusion splicer, which requires a reduced space for housing in a housing case when housed together with the fusion splicer, manufactured at a low cost, and has a good assembled state between a first operation tray and a second operation tray which are separately formed.

DESCRIPTION OF EMBODIMENTS

The embodiments according to the present disclosure will be described.

(1) A neck-hung operation tray for a fusion splicer according to an embodiment of the present disclosure includes a first operation tray in which the fusion splicer for splicing optical fibers is mounted, and a second operation tray which can be assembled with the first operation tray, in which the first operation tray includes an installation surface on which the fusion splicer is installed, a pair of projecting parts disposed on an outer perimeter of the installation surface and having a through hole through which an operator passes a string-shaped member for mounting, and first openings disposed in the vicinity of the pair of projecting parts on the installation surface, respectively, and the second operation tray includes an operation surface, a second opening formed in the operation surface, and an engaging part projecting outward from the second opening, the fusion splicer being mounted on the installation surface and a top surface of the engaging part in a state in which the second operation tray is assembled with the first operation tray when the engaging part is engaged in the first opening and each of the projecting parts is accommodated in the second opening.

According to this configuration, it is possible to provide a neck-hung operation tray for a fusion splicer, which requires a reduced space for housing in a housing case when housed together with the fusion splicer, manufactured at a low cost, and has a good assembled state between the first operation tray and the second operation tray which are separately formed.

(2) In a state where the first operation tray and the second operation tray are combined, the installation surface and the top surface of the engaging part may be flush with each other. According to this configuration, it is possible to appropriately prevent the operation tray from rattling when mounting the fusion splicer.

(3) Each of the projecting parts may be disposed at a center of two opposing sides among four sides constituting the installation surface having a rectangular shape, respectively, and the first opening may be configured from a pair of first openings between which each of the projecting parts is disposed, the second opening may be disposed at a center of one side among the four sides constituting the operation surface having a rectangular shape, and the engaging part may be configured from a pair of engaging parts between which the second opening is disposed.

According to this configuration, the pair of engaging parts may be engaged with the pair of first openings, thereby reliably assembling the second operation tray to the first operation tray.

(4) The first opening may further include an opening formed on a side different from the two sides of the installation surface on which the pair of first openings are disposed.

According to this configuration, for example, since the second operation tray can be assembled with the first operation tray near the operator, it is possible to secure a larger operation surface.

(5) The first operation tray and the second operation tray may be configured to have the same shape.

According to this configuration, since the same mold can be used to manufacture the first operation tray and the second operation tray, it is possible to further reduce the cost for manufacturing the mold.

Detailed Description of Embodiments

Hereinafter, an embodiment of the neck-hung operation tray for the fusion splicer according to the present disclosure will be described with reference to the drawings.

As shown in FIG. 1, a neck-hung operation tray 1 is an operation tray that can be hung around the neck of an operator U by a belt B (as an example of a string-shaped member) with a fusion splicer 100 being placed on the top surface thereof. The fusion splicer 100 is a device that fusion-splices the optical fibers and further reinforces the spliced portion, on the site where the optical fiber equipment is being installed. In this embodiment, a side facing the operator U with respect to the fusion splicer 100 is referred to as a front direction, a rear side from the fusion splicer 100 when viewed from the operator U is referred to as a rear direction, and the left and right sides of the operator U are referred to as a left-right direction.

Figure 2:
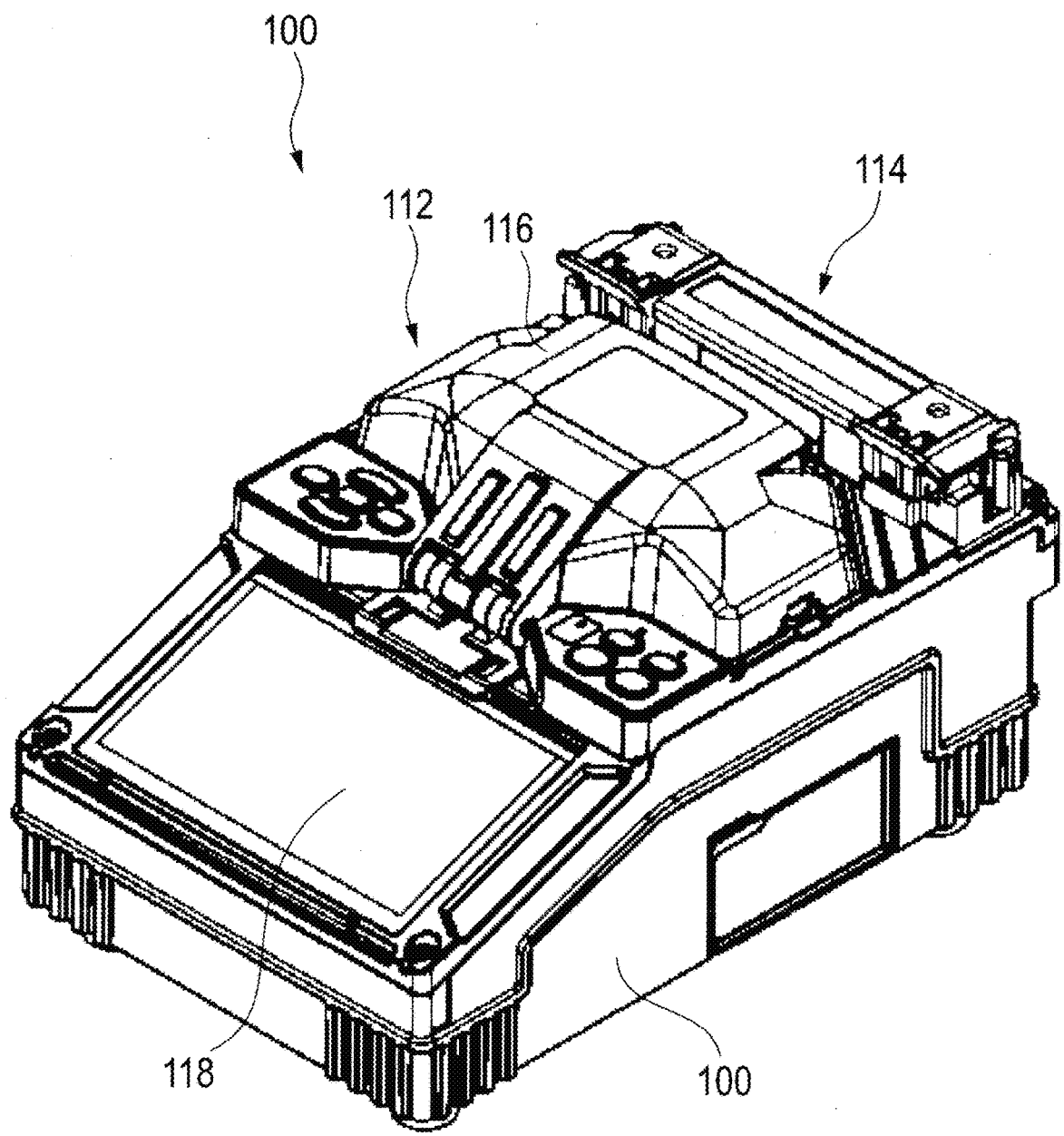
FIG. 2 is a perspective view of the fusion splicer that can be installed in the neck-hung operation tray of FIG. 1.
Figure 3:
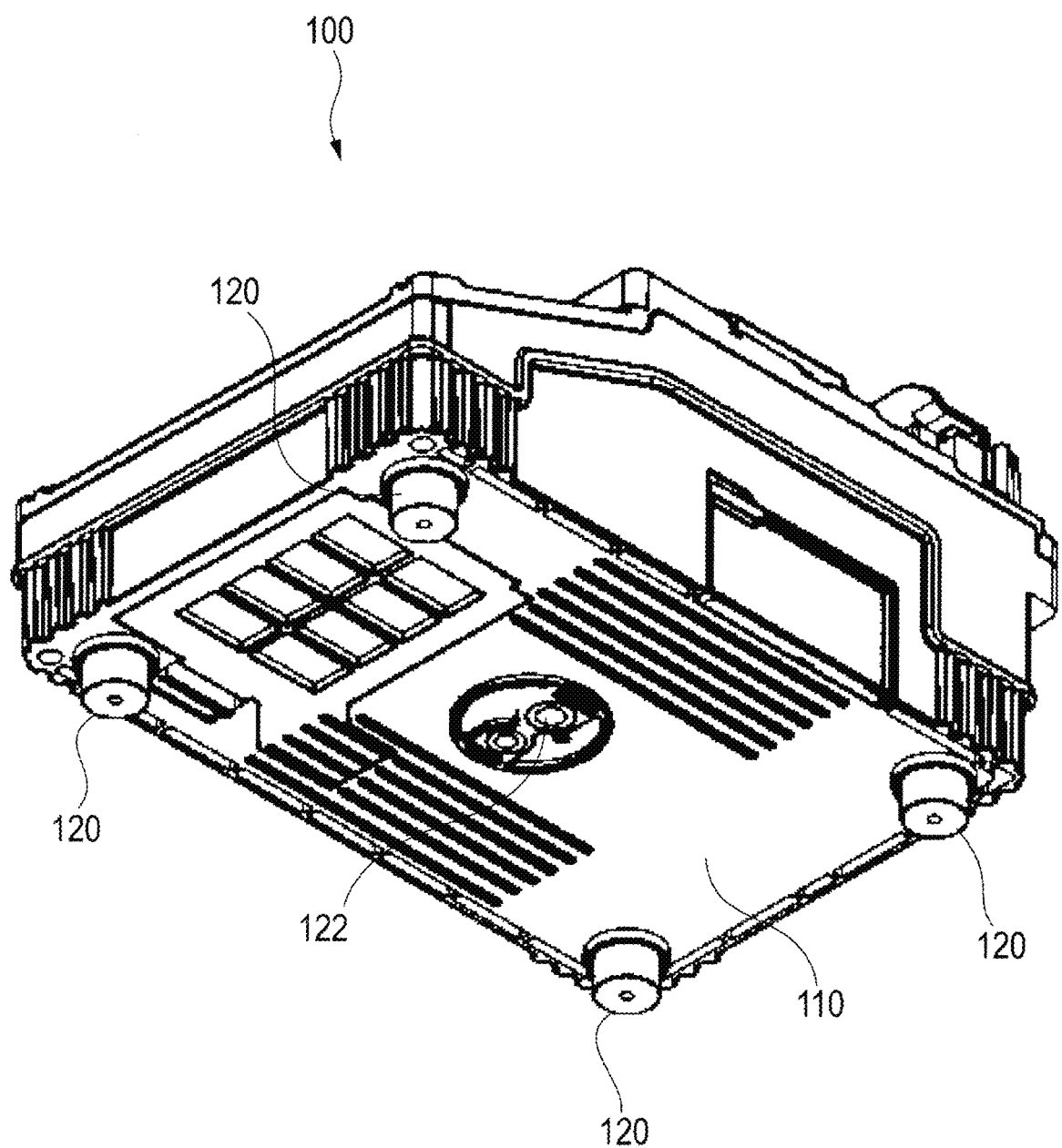
FIG. 3 is a bottom perspective view of the fusion splicer of FIG. 2.

As shown in FIG. 2, the fusion splicer 100 has a cube-shaped main body 110, and includes a fusing part 112 for splicing an optical fiber on a top surface of the main body 110, and a reinforcing device 114 for reinforcing the spliced portion of the optical fiber. The fusing part 112 is opened and closed by an opening and closing cover 116. In addition, a monitor 118 is provided on a front side of the main body 110. While watching an image of the monitor 118, the operator U can perform welding operation by operating an operation part displayed on the monitor 118. As shown in FIG. 3, legs 120 are projected downward from four corners of a bottom surface of the main body 110. In addition, a screw hole 122 to be fixed with the neck-hung operation tray 1 is formed at a center of the bottom surface of the main body 110.

Figure 4:
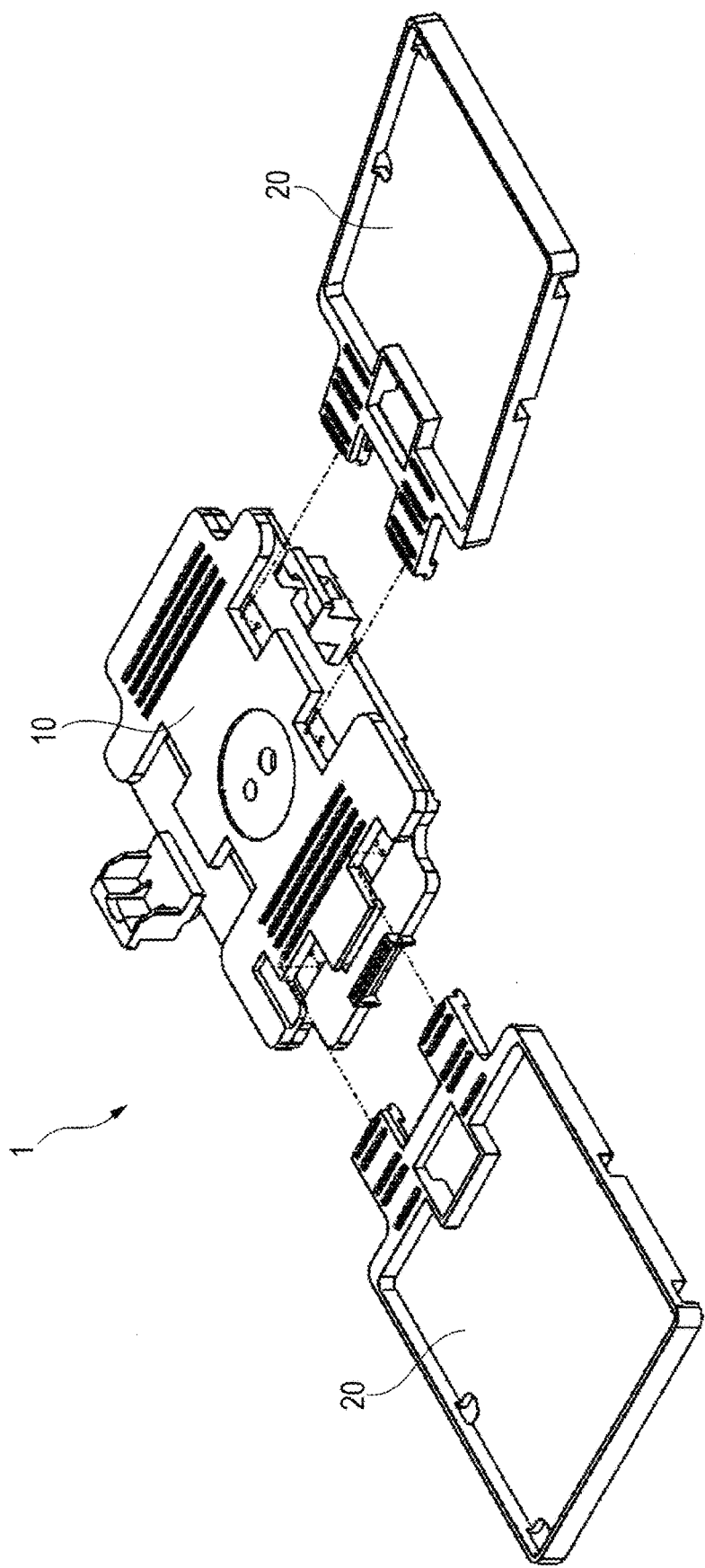
FIG. 4 is a perspective view of a first operation tray and a second operation tray included in the neck-hung operation tray before being assembled.

As shown in FIG. 4, the neck-hung operation tray 1 is configured from a first operation tray 10 on which the fusion splicer 100 is installed, and a second operation tray 20 which can be combined with the first operation tray 10. The first operation tray 10 and the second operation tray 20 are formed by die-molding a resin material of a thermoplastic resin or a thermosetting resin, for example. These operation trays 10 and 20 may be configured from various materials such as ceramics, metals, wooden materials, and the like.

Figure 5:
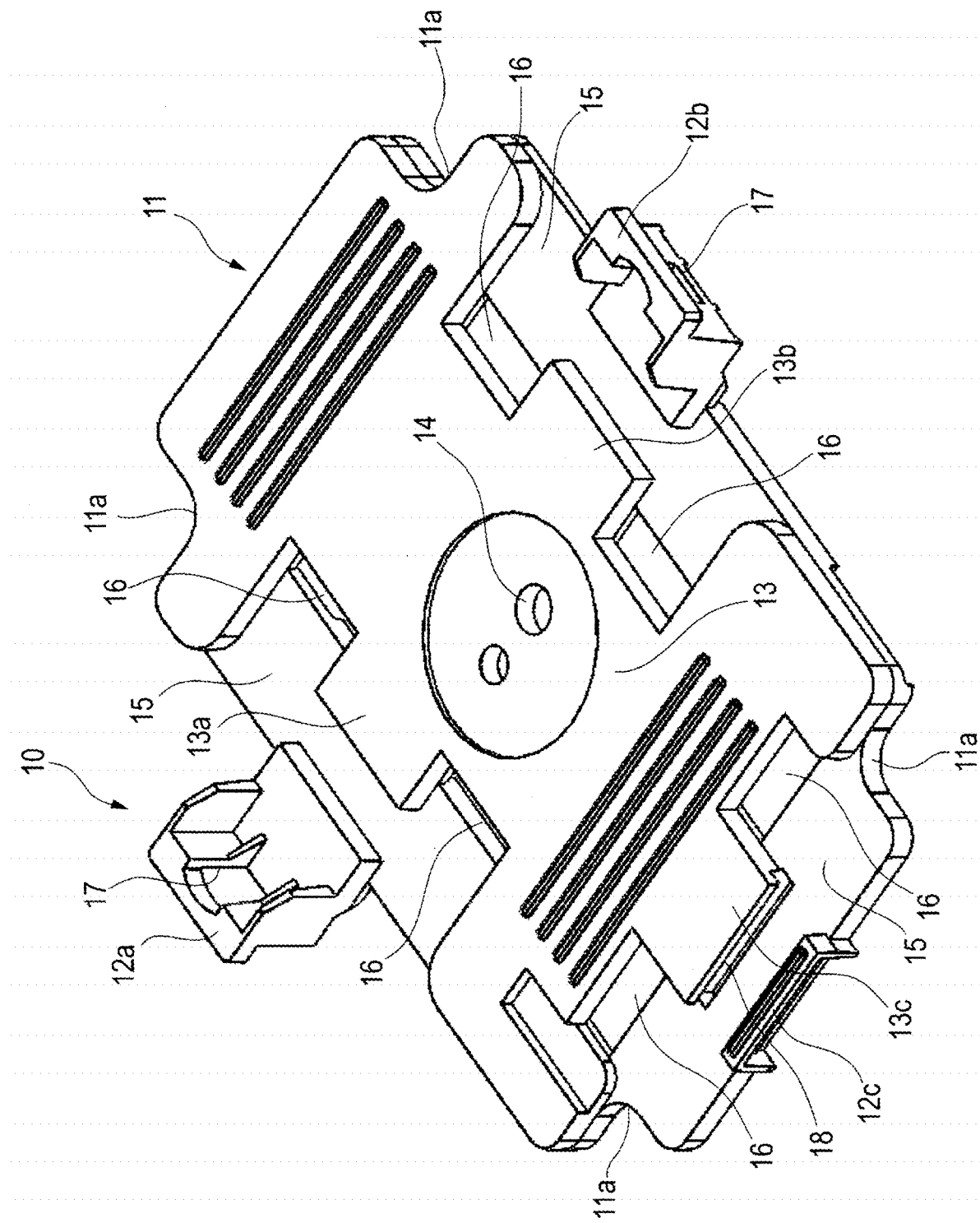
FIG. 5 is a perspective view of the first operation tray.

As shown in FIG. 5, the first operation tray 10 includes a rectangular installation part 11 on which the fusion splicer 100 is installed, and a pair of projecting parts 12a and 12b projecting from an outer perimeter of the installation part 11. Notches 11a are formed at four corners of the rectangular installation part 11 to accommodate the legs 120 (see FIG. 3) of the fusion splicer 100. A top surface of the installation part 11 is configured as an installation surface 13 on which the fusion splicer is placed. A fixing hole 14 is opened at a center of the installation surface 13 to secure the fusion splicer 100 by screwing when the fusion splicer 100 is installed on the installation surface 13.

Among the four sides of the installation part 11, on the three sides excluding the rear side, that is, on the two sides on the left and right and one side on the front, there are provided engagement surfaces 15 that are one step lower than the installation surface 13. A pair of openings 16 (as an example of a first opening) disposed in parallel is formed in each of the engagement surfaces 15, respectively. Each of the openings 16 has a rectangular shape, and portions (13a to 13c) of the installation surface 13 extend between the openings 16 toward each of the engagement surfaces 15. Projecting parts 12a and 12b are provided on the left and right sides of the installation part 11, respectively, extending toward the engagement surface 15 side, respectively, at positions facing the installation surfaces 13a and 13b. The projecting parts 12a and 12b are formed to have an S shape when the first operation tray 10 is viewed from the front side. A through hole 17 is formed in each of the projecting parts 12a and 12b, through which the belt B (see FIG. 1) is passed when the operator U uses the belt B to carry the neck-hung operation tray 1. In addition, a projecting part 12c projecting upward on the front side of the installation part 11 is provided, extending toward the engagement surface 15 side, at a position facing the installation surface 13c. In addition, a slit 18 is formed on the projecting part 12c side of the installation surface 13c, which extends in the left-right direction.

Figure 6:
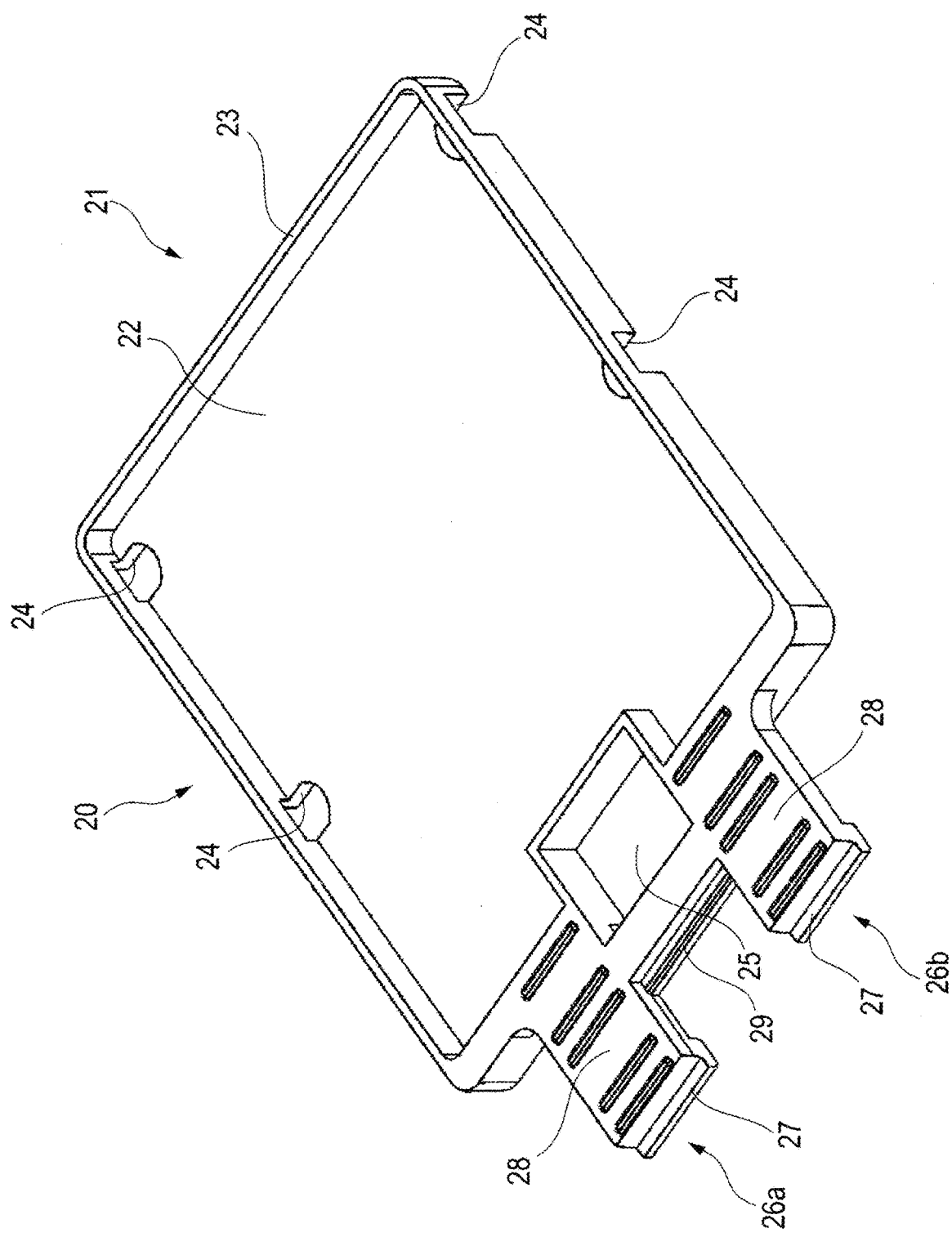
FIG. 6 is a perspective view of the second operation tray.

As shown in FIG. 6, the second operation tray 20 has a rectangular main body 21, with a top surface thereof being configured as an operation surface 22 for the operator U to perform optical fiber preprocessing operation and the like. An outer perimeter of the operation surface 22 is surrounded by a wall 23, and the wall 23 prevents various articles (not shown) such as optical fibers and tools used for the preprocessing operation from falling off from the operation surface 22. In addition, provided between the operation surface 22 and the wall 23 are a plurality of through holes 24 for attaching the cord of the tool or for the belt (not shown) to be passed therethrough to be tied to the waist of the operator U.

On one of the four sides of the operation surface 22, a rectangular opening 25 (as an example of a second opening) is formed at a center thereof. The opening 25 is sized to accommodate each of the projecting parts 12a and 12b of the first operation tray 10. In addition, a pair of engaging parts 26a and 26b are projected outward of the operation surface 22, at such positions that the opening 25 are positioned therebetween. Each of the engaging parts 26a and 26b has an L-shaped end portion 27. In addition, between the pair of engaging parts 26a and 26b, a projecting part 29 projecting from an outer edge of the wall 23 is formed at a position that is one step lower than the top surfaces 28 of the engaging parts 26a and 26b.

Next, in the configuration of such a neck-hung operation tray 1, an example where the second operation tray 20 is assembled with the right side of the first operation tray 10 will be described below with reference to FIG. 7.

Figure 7:
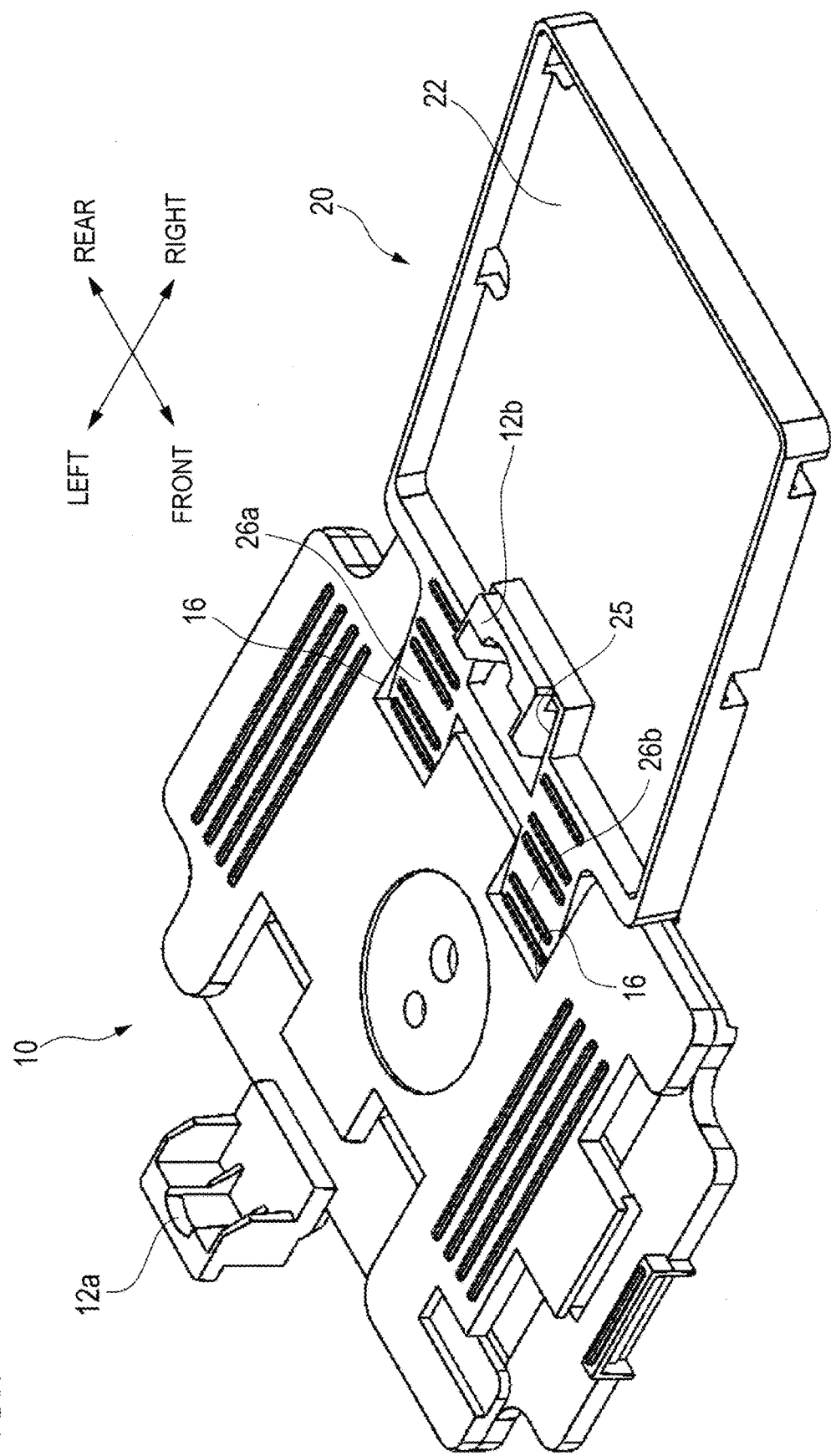
FIG. 7 is a perspective view illustrating a state where the second operation tray is being assembled with an engaging part on a left side of the first operation tray.

As shown in FIG. 7, a pair of L-shaped engaging parts 26a and 26b of the second operation tray 20 are inserted obliquely from above into the pair of openings 16 formed on the right side of the installation surface 13 of the first operation tray 10. In this state, as the second operation tray 20 is rotated so that the operation surface 22 of the second operation tray 20 is in the horizontal position, the projecting part 12b on the right side of the first operation tray 10 is housed in the opening 25 of the second operation tray 20. In this way, the second operation tray 20 can be assembled with the right side of the first operation tray 10. The second operation tray 20 can also be assembled with the left side of the first operation tray 10 in the same manner.

Figure 8:
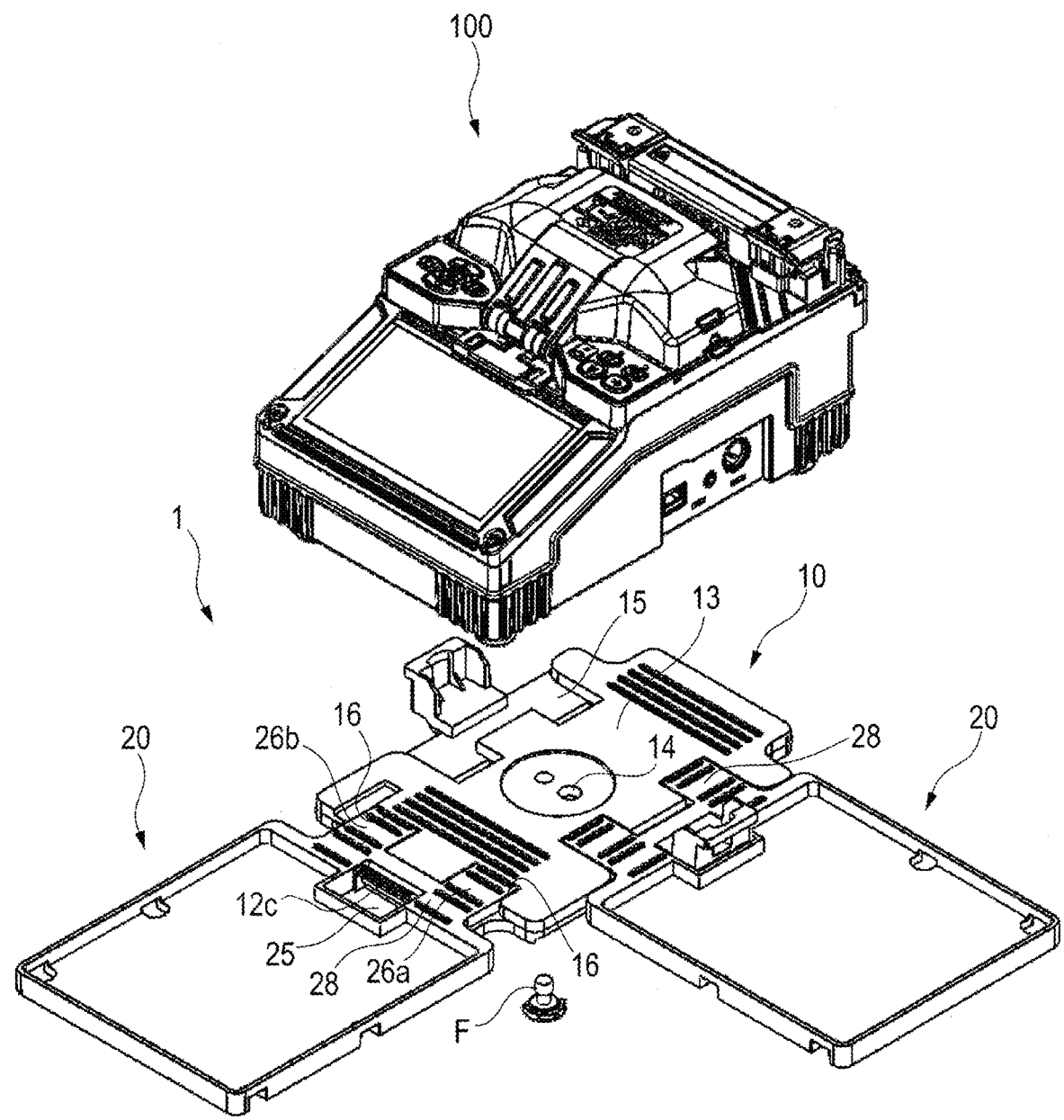
FIG. 8 is a perspective view illustrating a state where the second operation tray is assembled with the first operation tray.

In addition, as shown in FIG. 8, the second operation tray 20 can also be assembled with the front side of the first operation tray 10. In this case, a pair of engaging parts 26a and 26b of the second operation tray 20 are inserted obliquely from above into a pair of openings 16 formed in the front side of the installation surface 13 of the first operation tray 10, and the second operation tray 20 is rotated so that the operation surface 22 of the second operation tray 20 is in the horizontal position. As a result, the projecting part 12c on the front side of the first operation tray 10 is housed in the opening 25 of the second operation tray 20, and the projecting part 29 provided between the engaging parts 26a and 26b of the second operation tray 20 is engaged with the slit 18 provided on the projecting part 12c side of the installation surface 13c of the first operation tray 10.

In this way, in a state where the second operation tray 20 is assembled at a desired location on the first operation tray 10, as shown in FIG. 8, the fusion splicer 100 is mounted on the installation surface 13 of the first operation tray 10. Then, the fusion splicer 100 is fixed to the installation surface 13 of the first operation tray 10 by engaging a screw F with the screw hole 122 of the fusion splicer 100 through the fixing hole 14 of the first operation tray 10. At this time, a portion of the fusion splicer 100 is also mounted on the top surfaces 28 of the pair of engaging parts 26a and 26b of the second operation tray 20 assembled with the first operation tray 10.

As described above, the neck-hung operation tray 1 according to the present embodiment includes the first operation tray 10 on which the fusion splicer 100 is mounted, and the second operation tray 20 that can be assembled with the first operation tray 10. The first operation tray 10 includes the installation surface 13 on which the fusion splicer 100 is installed and the pair of projecting part 12a and 12b disposed on the outer perimeter of the installation surface 13 and having the through holes 17 for passing the belt B therethrough to be worn by the operator U, and openings 16 respectively disposed in the vicinity of the pair of projecting parts 12a and 12b in the installation surface 13. In addition, the second operation tray 20 includes the operation surface 22, the opening 25 formed in the operation surface 22, and the engaging parts 26a and 26b projecting outward from the opening 25. Then, the engaging parts 26a and 26b are engaged with the opening 16 and the projecting parts 12a and 12b are accommodated in the opening 25 such that the fusion splicer 100 is mounted on the installation surface 13 and the top surfaces of the engaging parts 26a and 26b in a state where the first operation tray 10 and the second operation tray 20 are assembled. As described above, in the present embodiment, when the fusion splicer 100 is fixed to the installation surface 13 of the first operation tray 10 in a state where the first operation tray 10 and the second operation tray 20 are combined, the engaging parts 26a and 26b of the second operation tray 20 can be sandwiched and fixed between the bottom surface of the main body 110 of the fusion splicer 100 and the engagement surface 15 of the first operation tray 10. Therefore, the assembled state of the first operation tray 10 and the second operation tray 20 can be secured.

In the present embodiment, as shown in FIG. 8, in a state where the second operation tray 20 is assembled with the first operation tray 10, the installation surface 13 and the top surfaces of the engaging parts 26a and 26b are flush with each other. Therefore, by mounting the fusion splicer 100 on the neck-hung operation tray 1, rattling when the second operation tray 20 is assembled with the first operation tray 10 may be reliably prevented.

In addition, in the present embodiment, the openings 16 are formed on three sides among the four sides of the installation surface 13, that is, on the left and right sides and on the front side. Therefore, it is possible to secure a large operation surface by assembling three second operation trays 20 to the left and right sides and to the front side of the fusion splicer 100 installed in the first operation tray 10.

Figure 9:
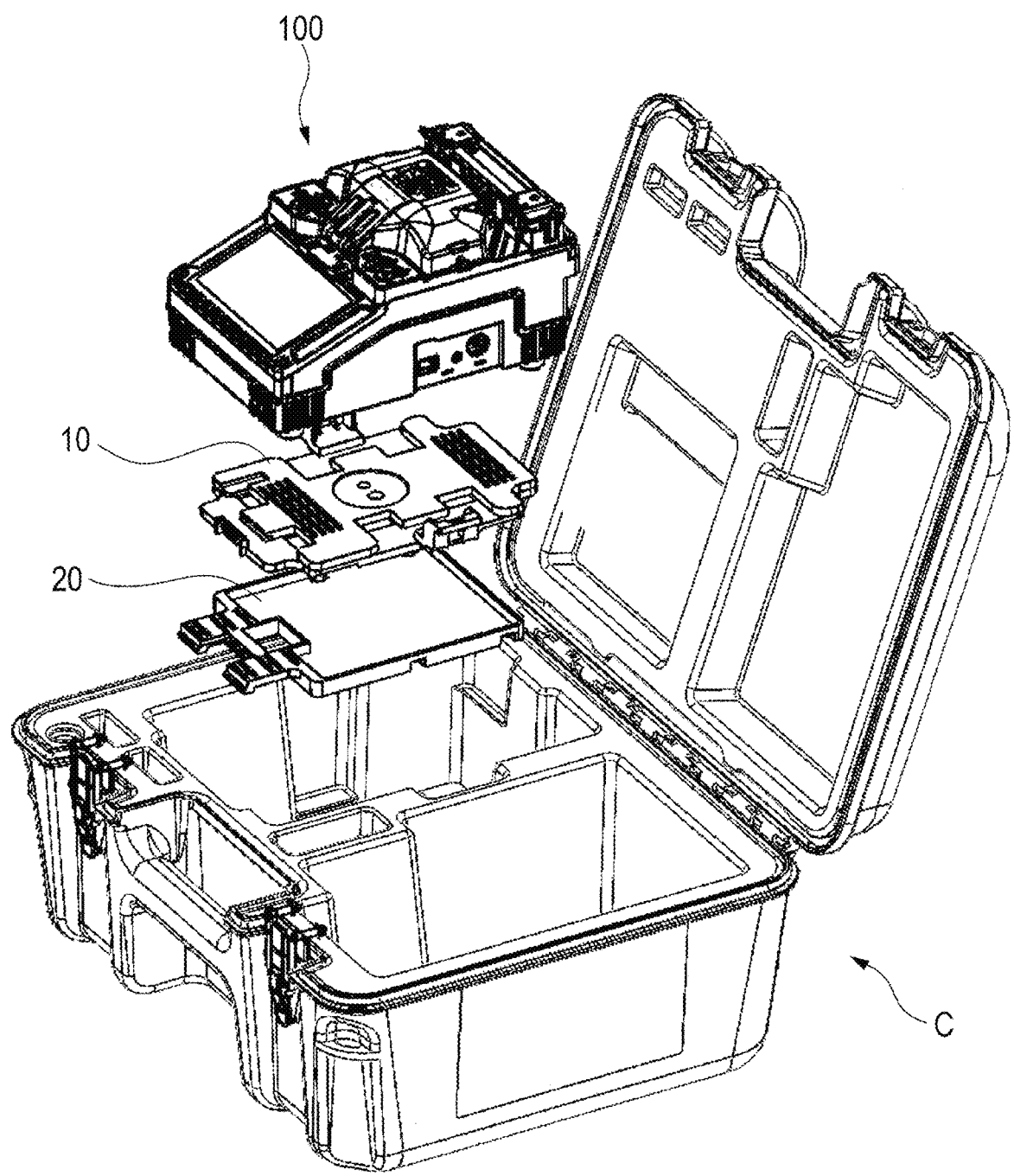
FIG. 9 is a perspective view illustrating a state where the fusion splicer, the first operation tray, and the second operation tray are to be housed in a housing case.
Figure 10:
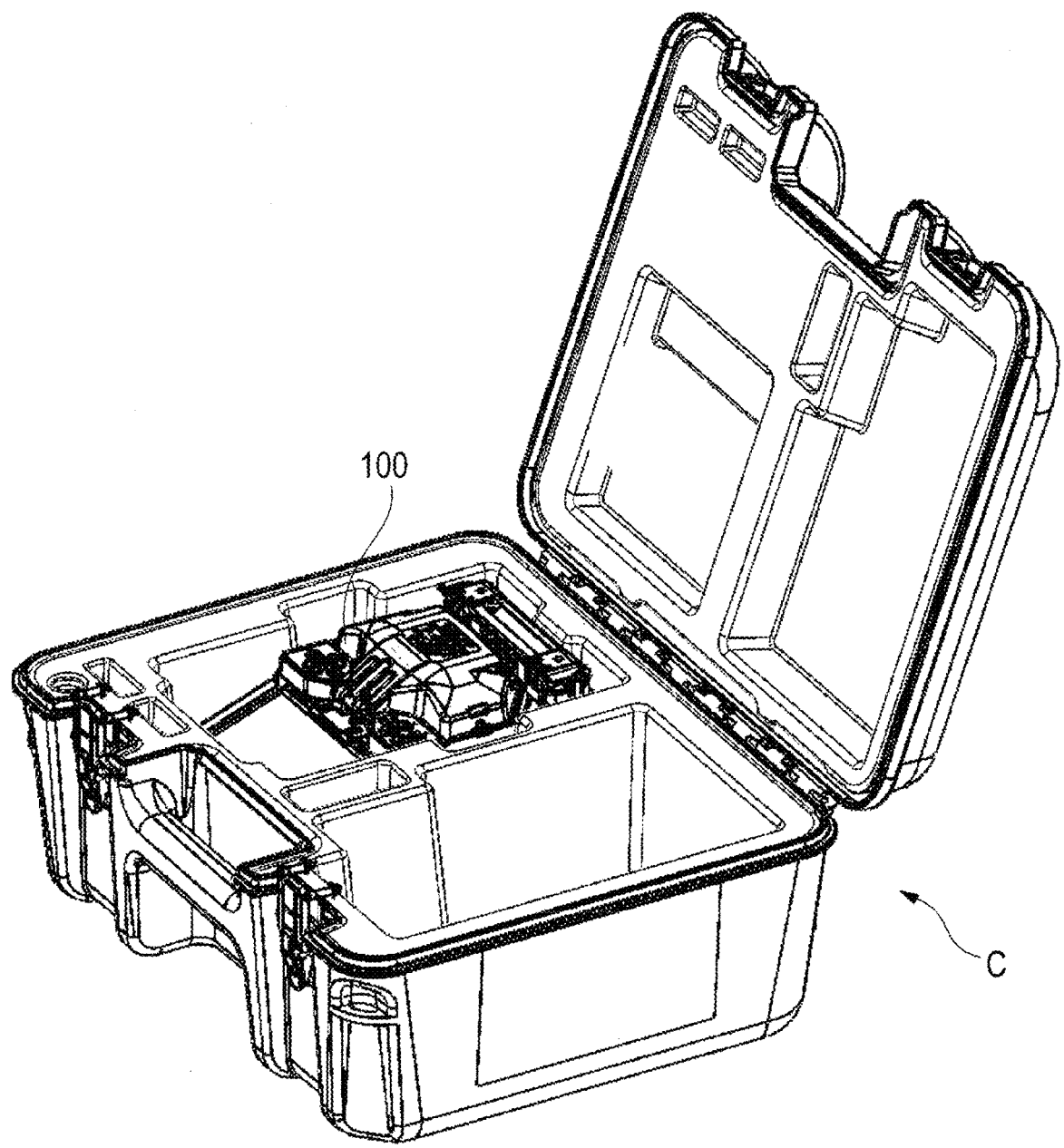
FIG. 10 is a perspective view illustrating a state where the fusion splicer, the first operation tray, and the second operation tray are housed in the housing case.
Figure 11:
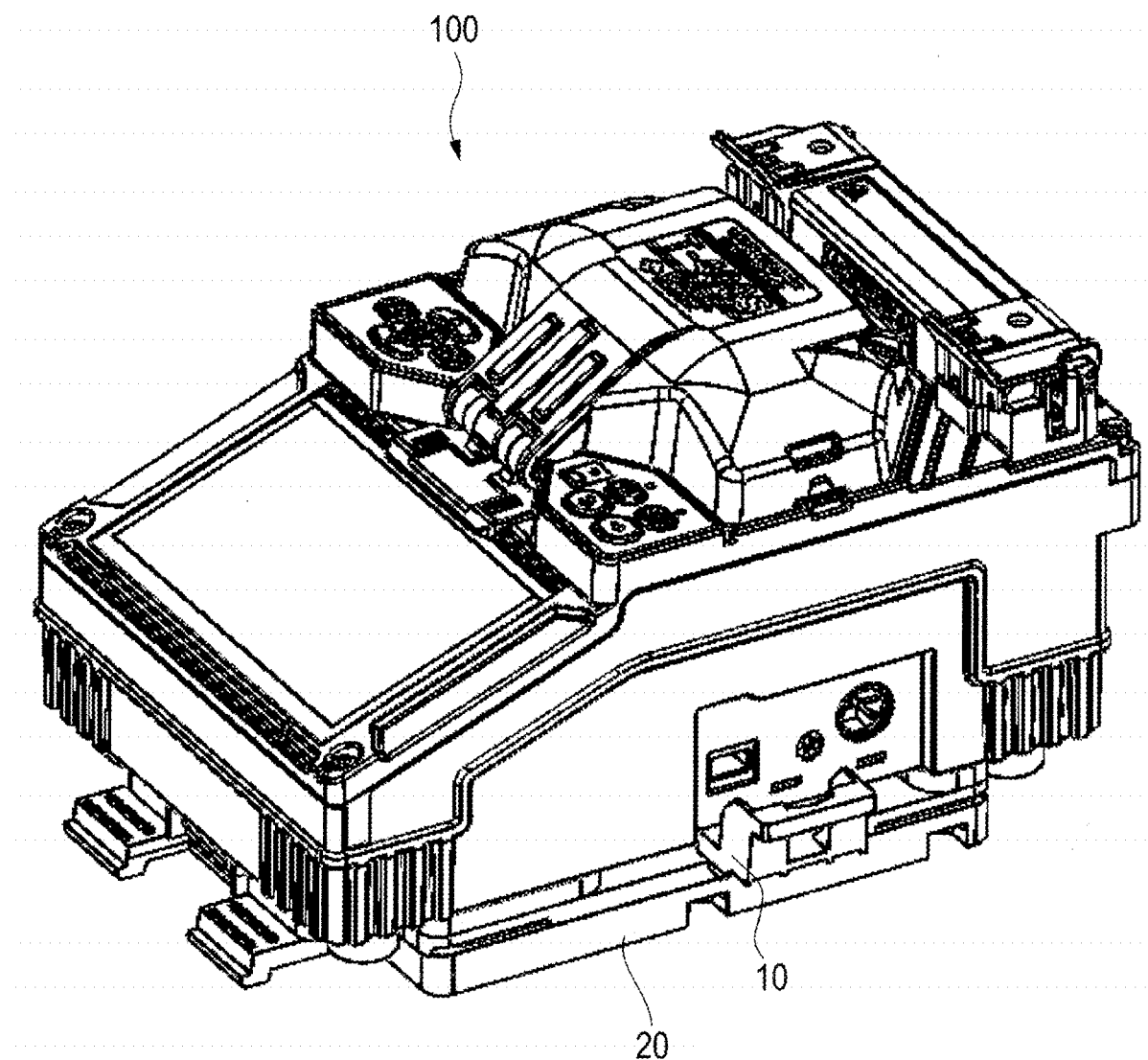
FIG. 11 is a perspective view illustrating a state where the first operation tray and the second operation tray are disposed under the fusion splicer.

As shown in FIGS. 9 to 11, the neck-hung operation tray 1 of the present embodiment is housed in the housing case C such that in a disassembled state, the first operation tray 10 and the second operation tray 20 are overlappingly accommodated under the fusion splicer 100. Accordingly, by housing the first operation tray 10 and the second operation tray 20 under the fusion splicer 100 in an overlapping manner, it is possible to save the space for housing the neck-hung operation tray 1.

In the neck-hung operation tray 1 according to the present embodiment, the first operation tray 10 and the second operation tray 20 are configured as separate bodies, and both of the operation trays 10 and 20 have a shape that is smaller and simpler than those of the conventional operation table as shown in Patent Literature 1. Therefore, the cost for manufacturing a mold used for shaping these operation trays 10 and 20 may be reduced.

As described above, while the invention has been described in detail and with reference to specific embodiments thereof, it will be apparent to those skilled in the art that various changes and modifications can be made without departing from the spirit and scope of the invention. Further, the number, the position, the shape, and the like of the above-described constituent members are not limited to the above embodiments, but can be changed to a suitable number, position, shape, and the like for implementing the present disclosure.

Figure 12:
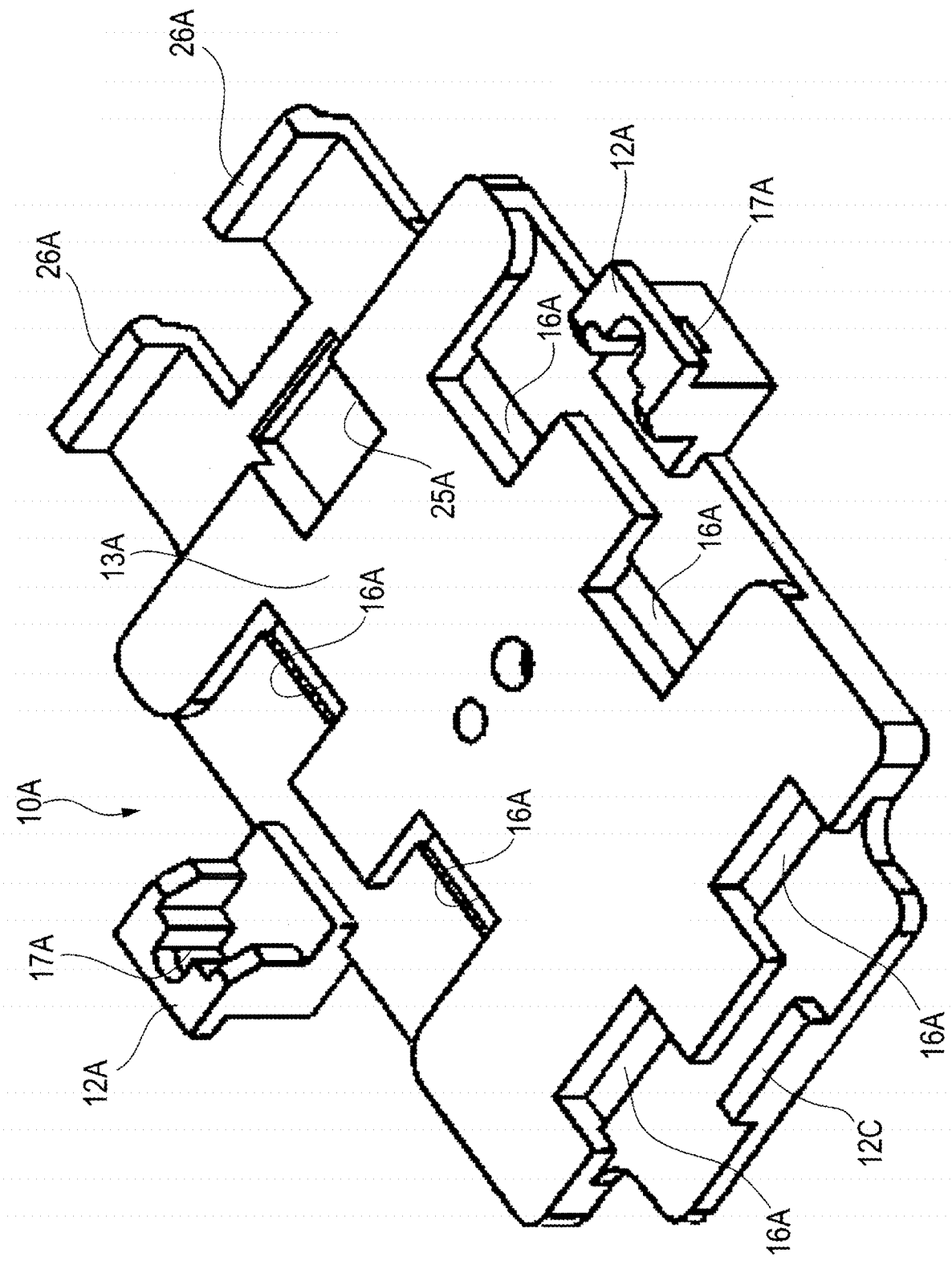
FIG. 12 is a perspective view illustrating an operation tray according to a modified example.
Figure 13:
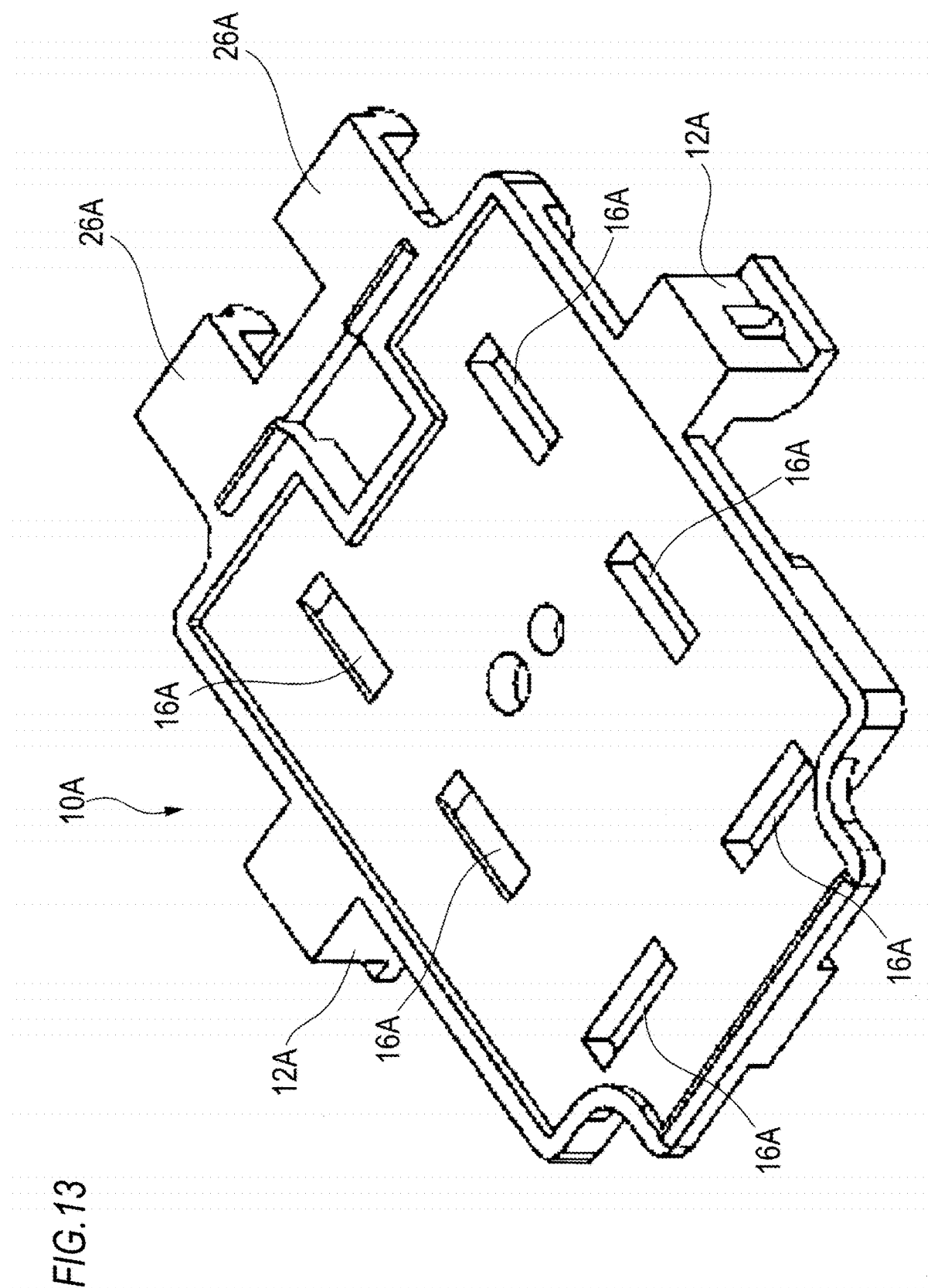
FIG. 13 is a bottom perspective view illustrating the operation tray of FIG. 12.

In the embodiment discussed above, the first operation tray 10 and the second operation tray 20 have different shapes, but not limited thereto. FIGS. 12 and 13 show an operation tray 10A according to a modified example. As shown in FIGS. 12 and 13, the operation tray 10A according to the modified example includes an installation surface 13A on which the fusion splicer 100 is installed, a pair of projecting parts 12A, a projecting part 12C disposed on a front side of the operation tray 10A, and openings 16A disposed respectively in the vicinity of the projecting parts 12A and 12C in the installation surface 13A. In addition, the operation tray 10A includes an opening 25A formed on a rear side, and an engaging part 26A projecting outward from the opening 25A.

Figure 14:
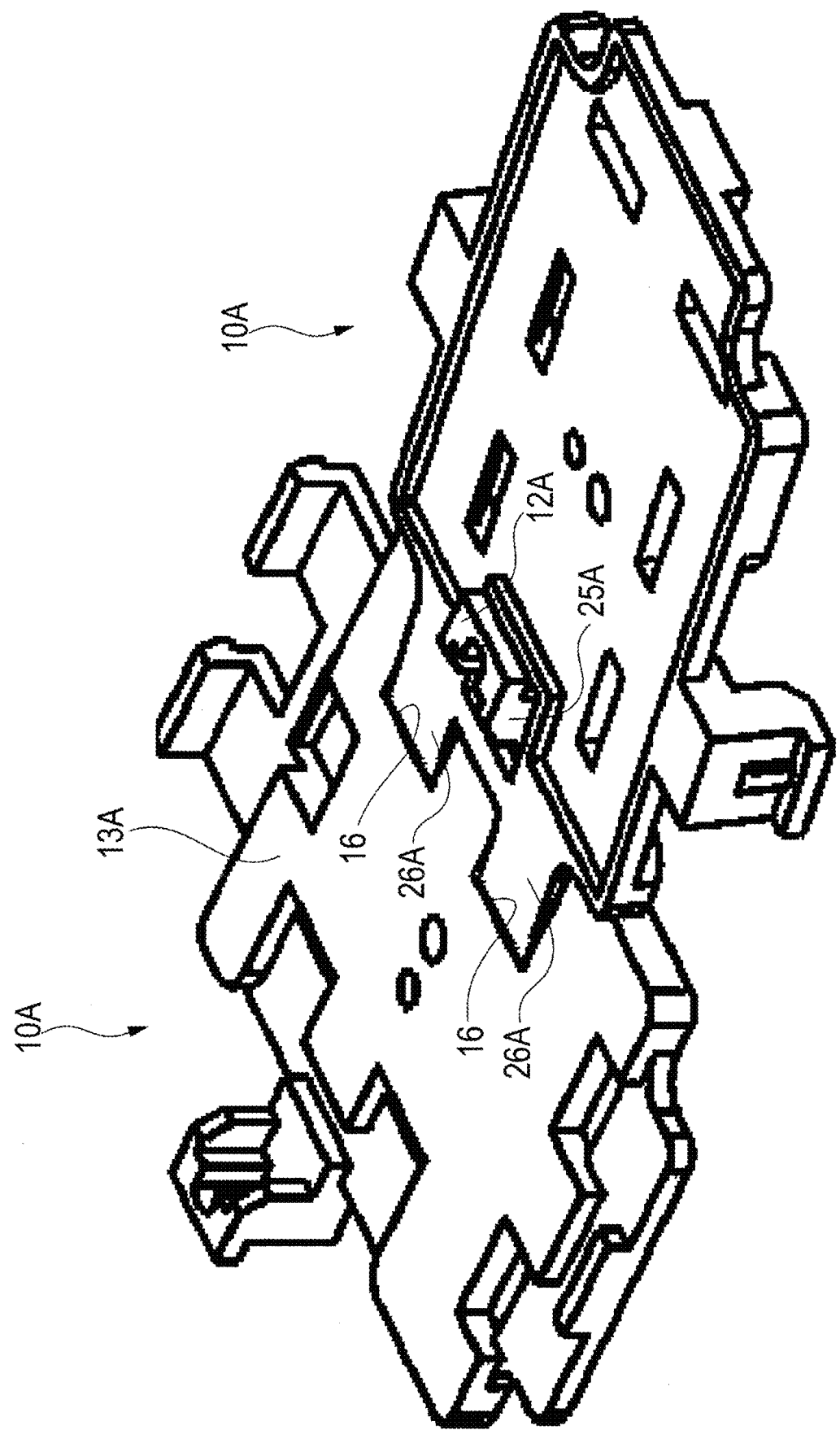
FIG. 14 is a perspective view illustrating a state where the operation trays of FIG. 12 are assembled with each other.

In this operation tray 10A, as shown in FIG. 14, an engaging parts 26A of one operation tray 10A are engaged with the openings 16A of the other operation tray 10A, and the projecting parts 12A and 12C of the other operation tray 10A are accommodated in the opening 25A of one operation tray 10A, thereby assembling them to each other. Then, by fixing the fusion splicer on the installation surface 13A of one operation tray 10A, the assembled state of the plurality of operation trays 10A and 10A is properly maintained. Further, according to the configuration in the present modified example, since the same mold can be used to manufacture the operation trays 10A, it is possible to further reduce the cost for manufacturing the mold.

REFERENCE SIGNS LIST

1: Neck-hung operation tray for a fusion splicer
10: First operation tray
11: Installation part
11a: Notch
12a to 12c: Projecting part
13 (13a to 13c): Installation surface
14: Fixing hole
15a to 15c: Engagement surface
16: Opening (as an example of a first opening)
17: Through hole
18: Slit
20: Second operation tray
21: Operation part
22: Operation surface
23: Wall
24: Through hole
25: Opening (as an example of a second opening)
26a and 26b: Engaging part
27: End portion
100: Fusion splicer
110: Main body
112: Fusing part
114: Reinforcing device
116: Opening and closing cover
118: Monitor 118
120: Leg
122: Screw hole
B: Belt
U: Operator
F: Screw

The invention claimed is:

1. A neck-hung operation tray for a fusion splicer, comprising:
a first operation tray in which a fusion splicer for splicing optical fibers is mounted, and
a second operation tray which can be assembled with the first operation tray,
the first operation tray including
an installation surface on which the fusion splicer is installed,
a pair of projecting parts disposed on an outer perimeter of the installation surface and having a through hole through which an operator passes a string-shaped member for mounting, and
first openings disposed in the vicinity of the pair of projecting parts on the installation surface, respectively, and
the second operation tray including
an operation surface,
a second opening formed in the operation surface, and
an engaging part projecting outward from the second opening,
the fusion splicer being mounted on the installation surface and a top surface of the engaging part in a state in which the second operation tray is assembled with the first operation tray when the engaging part is engaged in the first opening and each of the projecting parts is accommodated in the second opening.

2. The neck-hung operation tray according to claim 1, wherein
the installation surface and the top surface of the engaging part are flush with each other in a state in which the first operation tray and the second operation tray are combined.

3. The neck-hung operation tray according to claim 1, wherein
each of the projecting parts is disposed at a center of two opposing sides among four sides constituting the installation surface having a rectangular shape, respectively,
the first opening is configured from a pair of first openings between which each of the projecting parts is disposed,
the second opening is disposed at a center of one side among the four sides constituting the operation surface having a rectangular shape, and
the engaging part is configured from a pair of engaging parts between which the second opening is disposed.

4. The neck-hung operation tray according to claim 1, wherein
the first opening further includes an opening formed on a side different from the two sides of the installation surface on which the pair of first openings are disposed.

5. The neck-hung operation tray according to claim 1, wherein
the first operation tray and the second operation tray are configured to have the same shape.

* * * * *